United States Patent
He

(10) Patent No.: US 6,878,799 B2
(45) Date of Patent: Apr. 12, 2005

(54) ACID FUNCTIONAL POLYMER DISPERSANTS

(75) Inventor: Zhiqiang Alex He, Ridgefield, CT (US)

(73) Assignee: King Industries, Inc., Norwalk, CT (US)

( * ) Notice: Subject to any disclaimer, the term of this patent is extended or adjusted under 35 U.S.C. 154(b) by 668 days.

(21) Appl. No.: 09/804,214

(22) Filed: Mar. 12, 2001

(65) Prior Publication Data

US 2002/0169251 A1 Nov. 14, 2002

(51) Int. Cl.$^7$ ............................................. C08G 69/26
(52) U.S. Cl. ....................................... 528/332; 528/335
(58) Field of Search ................................. 528/332, 335

(56) References Cited

U.S. PATENT DOCUMENTS

| | | |
|---|---|---|
| 4,224,212 A | 9/1980 | Topham |
| 4,398,955 A | 8/1983 | Stansfield et al. |
| 4,415,705 A | 11/1983 | Hutter |
| 4,496,686 A | 1/1985 | Ansel |
| 4,645,611 A | 2/1987 | Campbell et al. |
| 4,673,705 A | 6/1987 | Ansel et al. |
| 4,754,056 A | 6/1988 | Ansel et al. |
| 4,861,380 A | 8/1989 | Campbell et al. |
| 4,942,213 A | 7/1990 | Haubennestel et al. |
| 5,151,218 A | 9/1992 | Haubennestel et al. |
| 5,424,364 A | 6/1995 | Simms et al. |
| 5,700,395 A | 12/1997 | Thetford et al. |
| 6,037,414 A | 3/2000 | Simms et al. |
| 6,111,054 A | 8/2000 | Haubennestel et al. |

FOREIGN PATENT DOCUMENTS

| | | | | |
|---|---|---|---|---|
| EP | 0 768 321 A | 4/1997 | ............. | C08F/8/00 |

OTHER PUBLICATIONS

Polymer Exemption Guidance Manual, www.epa.gov/opptintr/newchems/polyguid.htm, May 22, 1997.

Henry Jakybauskas, *J. of Coatings Technology*, 1986, 58:736, pp. 71–82.

Tatsuo Sato, *J. of Coatings Technology*, 1993, 65:825, pp. 113–121.

John Schofield, *Handbook of Coatings Additives*, 1992, vol. 2, pp. 71–105.

Koichi Tsutsui, *J. of Coatings Technology*, 1990, 62:791, pp. 27–35.

*Primary Examiner*—Edward J. Cain
(74) *Attorney, Agent, or Firm*—Morgan & Finnegan, LLP

(57) ABSTRACT

The present invention is related to novel acid functional pigment dispersing agents. In particular, the invention is directed to novel polymers with acid functional groups for use as pigment dispersants. The novel polymers comprise polymeric amides with free carboxyl functional groups having the structure:

$$[PE\text{―}_m PA\text{―}A]_n \qquad (I)$$

wherein PE is a polyester, PA is a polyamine and A is an anhydride. The novel pigment dispersants of the present invention are particularly effective for the dispersion of high color carbon black and organic pigments. The advantages of the novel pigment dispersants over known amine functional polymeric dispersants are several. They do not tend to discolor when exposed to UV light. They do not inhibit acid catalyzed reactions such as melamine crosslinking or react with isocyanate or catalyze the isocyanate/$H_2O$ reaction. They are non-toxic or much less toxic to aquatic organisms. The novel dispersants, therefore can be used in acid catalyzed and isocyanate processes without the adverse effects of the prior art amine functional dispersants. Furthermore, the novel dispersants are environmentally safer.

52 Claims, No Drawings

ACID FUNCTIONAL POLYMER DISPERSANTS

INTRODUCTION

The present invention is related to novel acid functional pigment dispersing agents. In particular, the invention is directed to novel polymers with acid functional groups comprising polymeric amides with free carboxyl functional groups for use as pigment dispersants. The novel pigment dispersants of the present invention are particularly effective for the dispersion of high color carbon black and organic pigments. The advantages of the novel pigment dispersants over known amine functional polymeric dispersants are several. They do not tend to discolor when exposed to UV light. They do not inhibit acid catalyzed reactions such as melamine crosslinking or react with isocyanate or catalyze the isocyanate/$H_2O$ reaction. They are non-toxic or much less toxic to aquatic organisms. The novel dispersants, therefore can be used in acid catalyzed and isocyanate processes without the adverse effects of the prior art amine functional dispersants. Furthermore, the novel dispersants are environmentally safer.

BACKGROUND OF THE INVENTION

Pigments are dispersed as fine particles into a liquid medium for use in coatings, inks, molten plastics, cosmetics and adhesives. It is desirable for the pigment to be dispersed as finely as possible and as rapidly as possible into the liquid medium and remain as a stable fine dispersion over time for optimum results. Unfortunately, the dispersion of fine particles in liquids is unstable in that the particles tend to agglomerate or flocculate causing uneven pigmentation in the product where pigmentation is desired. To minimize the effects of agglomeration or flocculation, surface active pigment dispersants have been developed.

It is known that polymers with amine functional groups or polymers with heterocyclic bases or their salts are effective in adhering to the surfaces of the pigment particles. The adhesion of the dispersant to the particle surfaces of the pigment prevents agglomeration or flocculation and minimizes the time and force needed to disperse the pigment into a medium that is suitable for the end use. The amine functional polymers have been found to be particularly effective for pigments which are difficult to disperse, such as high color carbon black and organic pigments. Amine functional polymers produced by the reaction of polyethyleneimine and a polyester are described in U.S. Pat. Nos. 5,700,395, 4,645,611, 4,415,705 and 4,224,212 as pigment dispersants. Pigment dispersants wherein basic heterocycle groups with polyisocyanates are attached to polyesters and polyethers are taught in U.S. Pat. No. 4,942,213.

However, there are a number of disadvantages with such dispersants. The amine functional groups in these dispersants neutralize the acid catalysts used in acid catalyzed processes, e.g., the melamine cross linking process. For this reason the catalyst demand is increased or a higher cure temperature is required. The amine functional dispersants also cause problems in isocyanate crosslinking processes because they react with isocyanate and catalyze the isocyanate/$H_2O$ reaction. Both the melamine crosslinking and the isocyanate crosslinking processes are widely used in coatings, inks, and adhesives. The undesirable amine reaction with isocyanate increases the viscosity of the coating or printing ink formulations causing problems in application. As a result more solvent is required to lower the viscosity. This leads to an undesirable increase in VOC (volatile organic compounds). Moreover, the catalysis of the isocyanate/$H_2O$ reaction leads to increased gassing, which causes more surface defects in two component polyurethane coating systems. Further, the amine functional polymeric dispersants tend to yellow or discolor when exposed to UV light. The amine functional dispersants are potentially cationic polymers, which are suspected to be highly toxic toward aquatic organisms ("Polymer Exemption Guidance Manual" from EPA, May 22, 1997, Page 8). Therefore, it would be desirable to have non-amine functional catalysts with the good dispersant characteristics of amine functional dispersants without the problems caused by the presence of amine functional groups.

To solve these problems, dispersants with functional groups other than amines have been developed. For example, dispersants with acid functional groups prepared from acrylic acid polymer, styrene maleic anhydride copolymer and alkene maleic anhydride copolymer are known. U.S. Pat. No. 4,673,705 and U.S. Pat. No. 4,754,056 disclose radiation curable dispersants that are acrylate-functional carboxylic acid polyamides carrying free carboxyl groups. The polyamide is an adduct of a polyacrylate with a stoichiometrically deficient amount of a primary amine. Any secondary amine groups that may be present are also converted to an amide with a carboxylic acid anhydride. U.S. Pat. No. 6,037,414 disclosed a dispersant, a polyacrylate chain with cyclic imide functional groups and polyester side chains. U.S. Pat. No. 5,151,218 described phosophoric acid esters as suitable dispersants. The phosphoric acid ester is prepared by reacting phosphoric acid or a phosphate forming compound with a hydroxy compound that contains ether groups and ester groups or urethane groups. An example of a suitable polyether-polyester is the reaction product of a monofunctional polyether with caprolactone. A radiation curable pigment composition wherein the dispersant is an adduct of a mono functional polyether amine and maleic anhydride is described in U.S. Pat. No. 4,496,686. However, these dispersants generally are not as effective as amine functional dispersants in dispersing high color carbon black or organic pigments.

It is desirable to have a pigment dispersant that is as effective as the known amine functional dispersants but without amine functional groups or with a reduced amine content so that the dispersant can be used in acid catalyzed or isocyanate processes without the adverse effects of amine functional dispersants. It is also desirable to have an effective pigment dispersant with less toxicity than the known amine functional dispersants.

SUMMARY OF THE INVENTION

The present invention is directed to a polymeric dispersant that is a condensation product of a polyester and a polyamine wherein the free primary or secondary amine groups are converted to amides with a free carboxylic acid group by reaction with an anhydride. The structure of the polymer may be represented by structure I as follows.

(I)

wherein:
PE is a linear or branched polyester homo- or co-polymer with a molecular weight between 500–20,000, preferably 800–5,000, and wherein the degree of polymerization m is in the range of 1–100;

PA is selected from the group consisting of:
a. a polyalkylpolyamine wherein the alkyl is a $C_2$-$C_{10}$ alkyl selected from the group consisting of diethylene triamine, triethylenetetramine, tetraethylenepentamine, dipropylenetriamine, tripropylenetetramine, tetrapropylenepentamine, pentaethylenehaxamine, pentapropylenehexamine, bis(hexamethylene)triamine, N,N'-bis(3-aminopropyl)-ethylenedimine, tris(aminoethyl)amine, hexaethyleneheptamine, hexapropyleneheptamine, spermidine, and spermine;
b. a linear or branched polyalkylene imine selected from the group consisting of polyethyleneimine with a molecular weight up to 50,000, linear and branched polypropyleneimine with a molecular weight of up to 50,000,
c. polyallylamine;

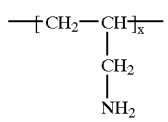

wherein x=10–1,000; and
d. a cycloaliphatic amine with more than two amine functional groups per molecule, selected from the group consisting of hydrogenated polyformaldehyde and aniline adduct, piperazinylethyldiethylenetriamine, piperazinylethylethylenediamine, piperazinylethyltriethylenetetraamine, piperazinylethyltetraethylenepentamine and hydrogenated diaminopyrimidine, and like compounds;
e. a mixture of the polymines defined in a), b) c) and d) above;
A is a moiety formed from the reaction of a 5 or 6 member ring anhydride with the free primary or secondary amines resulting from the condensation reaction of the polyester and the polyamine, an amic acid with the structure:

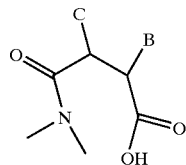

wherein B, C=H, $C_1$-$C_{20}$ alkyl or alkenyl or B and C together form a double bond, a cyclic aliphatic or aromatic group selected from the group consisting of benzyl, carboxyl substituted benzyl, cyclohexyl and cyclohexenyl, alkyl substituted cyclohexyl and cyclohexenyl, wherein alkyl is $C_1$-$C_{20}$, and n is the number of A moieties directly linked to PA and n=2–100, preferably 2–50.

The anhydrides useful in the present invention include preferably maleic anhydride, succinic anhydride, phthalic anhydride, tetrahydrophthalic anhydride, methyltetrahydrophthalic anhydride, hexahydrophthalic anhydride, methyl hexahydrophthalic anhydride, trimellitic anhydride, alkenyl and alkyl succinic anhydride wherein the alkenyl or alkyl is $C_1$-$C_{20}$ alkenyl or alkyl.

The polymeric dispersant of the present invention is prepared by the condensation of a polyester with a polyamine at a temperature of from 80° C. to 150° C., preferably from 100° C. to 130° C. The reaction between anhydride and the free amine group(s) of the condensation product of polyester and polyamine is exothermic and can be carried out at temperature from 0° C. to 100° C., preferably 20° C. to 80° C.

The present invention is also directed to a pigment dispersant composition comprising 1–90% by weight of a pigment, 0.1% to 250% of the pigment by weight of a dispersant of structure I in a liquid medium.

DETAILED DESCRIPTION OF THE INVENTION

The present invention is directed to a polymeric dispersant that is a condensation product of a polyester and a polyamine wherein the free primary or secondary amine groups are converted to amide groups with an anhydride leaving free carboxylic acid groups. The polymer may be expressed by structure I:

 (I)

wherein:
PE is a linear or branched polyester homo- or co-polymer with a moelcular weight between 500–20,000, preferably 800–5,000, and wherein the degree of polymerization m is in the range of 1–100;
PA is selected from the group consisting of:
a. a polyalkylpolyamine wherein the alkyl is $C_2$-$C_{10}$ alkyl selected from the group consisting of diethylene triamine, triethylenetetramine, tetraethylenepentamine, dipropylenetriamine, tripropylenetetramine, tetrapropylenepentamine, pentaethylenehaxamine, bis(hexamethylene)triamine, pentapropylenehexamine, N,N'-bis(3-aminopropyl)-ethylenedimine, tris(aminoethyl)amine, hexaethyleneheptamine, hexapropyleneheptamine, spermidine and spermine;
b. a linear or branched polyalkylene imine selected from the group consisting of polyethyleneimine with a molecular weight up to 50,000, linear and branched polypropyleneimine with a molecular weight of up to 50,000;
c. polyallylamine

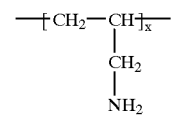

wherein x=10–1,000;
d. a cycloaliphatic amine with more than two amine functional groups per molecule, selected from the group consisting of hydrogenated polyformaldehyde and aniline adduct, piperazinylethyldiethylenetriamine, piperazinylethylethylenediamine, piperazinylethyltriethylenetetraamine, piperazinylethyltetraethylenepentamine and hydrogenated diaminopyrimidine, and like compounds; and
e. a mixture of the polyamines defines in a), b), c) and d);
A is a moiety formed from the reaction of a 5 or 6 member ring anhydride with the free primary or secondary amines resulting from the condensation reaction of the polyester and the polyamine, an amic acid with the structure:

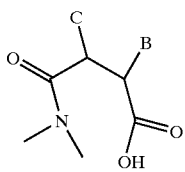

wherein B, C=H, $C_1$–$C_{20}$ alkyl or alkenyl or B and C together form a double bond, a cyclic aliphatic or aromatic group selected from the group consisting of benzyl, carboxyl substituted benzyl, cyclohexyl and cyclohexenyl, alkyl substituted cyclohexyl and cyclohexenyl, wherein alkyl is $C_1$–$C_{20}$ alkyl, and n is the number of A moieties directly linked to PA and n=2–100, preferably n=2–50.

The anhydrides useful in the present invention include preferably maleic anhydride, succinic anhydride, phthalic anhydride, tetrahydrophthalic anhydride, methyltetrahydrophthalic anhydride, hexahydrophthalic anhydride, methyl hexahydrophthalic anhydride, trimellitic anhydride, alkenyl and alkyl succinic anhydride wherein the alkenyl or alkyl moiety is $C_1$–$C_{20}$ alkenyl or alkyl.

The dispersant with structure I is synthesized by condensing a polyamine with a polyester derived from hydroxycarboxylic acids or their esters and converting the unreacted primary and secondary amine groups into an amide with a cyclic anhydride leaving a free carboxylic acid group.

The polyester, PE in Structure I, can be a homopolymer or a copolymer having a molecular weight of from 500–10000, preferably, 800–5000. The hydroxycarboxylic acid monomer used to make the polyester can be a hydroxycarboxylic ester or a lactone or a polyhydroxycarboxylic acid with more than one hydroxy group. The alkyl group between the hydroxy and the carboxyl groups of the hydroxycarboxylic acid is a branched or linear alkyl having 1 to 20 carbon atoms. The hydroxycarboxylic acids useful for the present invention include lactic acid, glycolic acid, hydroxybutyric acid, 6-hydroxyhexanoic acid, dimethylolpropionic acid, ricinoleic acid, 12-hydroxystearic acid, 12-hydroxydodecanoic acid, 5-hydroxydodecanoic acid, 5-hydroxydecanoic acid and 4-hydroxydecanoic acid. The esters and lactones, an internal ester of hydroxycarboxylic acids, such as ε-caprolactone or methyl-ε-caprolactone are also useful. The hydroxycarboxylic acid, the ester or lactone monomer may be used individually to prepare homopolymers or in combination with another hydroxycarboxylic acid, ester or lactone to make copolymers, terpolymers, tetrapolymers, etc.

Optionally, a monoalkyl acid without a hydroxy group can be added as a chain terminating group. The method of preparing polyester from carboxylic acids, their esters, or lactones, are known, e.g., U.S. Pat. Nos. 5,700,395; 4,645,611; 4,415,705 and 4,224,212. The reaction is usually carried out at a temperature of from 100° C. to 250° C., preferably from 150° C. to 220° C. Esterification or transesterification catalysts, such as p-toluenesulfonic acid, tetrabutyl titanate or dibutyl tin oxide can be used to accelerate the rate of the reaction. The polymer product can be in the form of a crystalline solid, a wax or a liquid depending on the monomeric hydroxycarboxylic acids used.

The polyamines used in this invention are multifunctional amines with more than two primary or secondary amine moieties, such as polyalkylpolyamines or polyalkyleneimines wherein the alkyl is a $C_2$–$C_{10}$ alkyl. Typical polyamines include polyalkylpolyamines such as diethylenetriamine, triethylenetetramine, tetraethylenepentamine, dipropylenetriamine, tripropylenetetramine, tetrapropylenepentamine, pentaethylenehaxamine, bis(hexamethylene)triamine, pentapropylenehexamine, N, N'-bis(3-aminopropyl)-ethylenedimine, tris(aminoethyl)amine, hexaethyleneheptamine, hexapropyleneheptamine, spermidine and spermine. Homolgues of the above wherein alkyl with higher number of carbon atoms up to 10 carbon atoms are also contemplated. Typical polyalkyleneimines include linear and branched polyalkyleneimines such as linear and branched polyethyleneimines, linear and branched polypropyleneimines. The polyalkyleneimines useful in the invention are those with a molecular weight of up to 50,000. The polyamines may be polyallylamines wherein the number of repeat units are from 10 to 1,000. Cycloaliphatic amine with more than two amine functional groups per molecule, such as hydrogenated polyformaldehyde and aniline adduct, piperazinylethyldiethylenetriamine, piperazinylethylethylenediamine, piperazinylethyltetraethylenepentamine, piperazinylethylethylenediamine, hydrogenated diaminopyrimidine, and like compounds are also useful. Other polyamines similar to those listed above with alkyl of higher number of carbons, or a mixture of the polyalkylpolyamines may also be used. Some of the commercial polyalkylpolyamines may be a mixture of primary, secondary and tertiary amines. The reaction between the polyester and the polyamine can be carried out at a temperature of from 80° C. to 150° C., preferably from 100° C. to 130° C.

The anhydrides suitable for this invention are monocyclic anhydrides with a 5 or 6 member ring. Typical cyclic anhydrides include maleic anhydride, succinic anhydride, phthalic anhydride, tetrahydrophthalic anhydride, methyltetrahydrophthalic anhydride, hexahydrophthalic anhydride, methyl hexahydrophthalic anhydride, trimellitic anhydride, alkenyl and alkyl succinic anhydride wherein alkyl or alkenyl is $C_1$–$C_{20}$ alkyl or alkenyl. The reaction is carried out at a temperature of from 0° C. to 100° C., preferably 20° C. to 80° C.

The acid functional polymeric dispersants of the present invention can be incorporated into a pigment composition for use in formulations for coatings, inks, cosmetics, adhesives or in plastics. The pigment dispersion composition of the present invention comprises a polymeric dispersant of structure I and a pigment. The pigment dispersion composition may also comprise a liquid medium in solvent or molten form depending on the end use. The composition may contain 1–90 wt % of the pigment as a solid. The concentration of the dispersant can vary from 0.1 to 250% of the weight of the pigment in the composition. Optionally, the dispersant may be in the form of a salt of the free carboxylic acid group with a metal or an organic base as the counter ion. The composition may comprise a thermoset or a thermoplastic resin, crosslinking agents, flow leveling agents, wetting agents, thickeners, anti-settling agents, UV stabilizers and other additives to enhance the end use performance. The dispersants in this invention may be used together with other dispersion aids, such as a grinding resin or an additive to achieve synergistic effects.

The thermoplastic resins useful in this invention are conventional thermoplastic resins which become fluid on heating and do not become infusible. Typical thermoplastic resins include: polyacrylics, polyesters, polyolefins, polystyrenes, etc.

The thermosetting resins useful in this invention include resins which undergo a chemical reaction when heated, catalyzed, or subject to UV radiation and become relatively infusible. Typical reactions in thermosetting resins include oxidation of unsaturated double bonds, reactions involving epoxy/amine, epoxy/carboxyl. epoxy/hydroxyl, polyisocyanate/hydroxy, amino resin/hydroxy moieties; free radical reactions of polyacrylate, cationic polymerization of epoxy resins and vinyl ether, condensation of silanol, etc.

Polymers with hydroxy functionality (frequently polyols) are widely used in thermosetting system to crosslink with amino resins or polyisocyanates. The polyols include acrylic polyols, alkyd polyols, polyester polyols, polyether polyols and polyurethane polyols. Typical amino resins include melamine formaldehyde resins, benzoguanamine formaldehyde resins, urea formaldehyde resins and glycoluril formaldehyde resins. Polyisocyanates are resins with two or more isocyanate groups, including both monomeric aliphatic diisocyanates, monomeric aromatic diisocyanates and their polymers. Typical monomeric diisocyanates include hexamethylene diisocyanate, isophorone diisocyanate, hydrogenated diphenylmethane diisocyanate and tetramethylxylene diisocyanate. Typical aromatic isocyanates included toluene diisocyanates and bisphenylmethane diisocyanates.

The dispersants of the present invention may be used with an individual pigment or a mixture of pigments to achieve a desired color. The dispersants of the present invention may be used with organic and inorganic pigments, which have or have not been surface treated. The pigment dispersion can be made by grinding or milling the dry pigments with the dispersants of the present invention or by mixing the pigments with the dispersant in a liquid medium in a pigment flushing process.

The dispersants of the present invention may be used in liquid media such as solvents, reactive diluents, or molten resins, such as thermoplastic or thermosetting resins, and in powdered coating resin compositions. The solvents can be ketones, ethers, esters, alcohols, aromatic or aliphatic solvents. The reactive diluents are liquid organic compounds with reactive functional groups, such as hydroxy, acrylate or acetoacetate functional groups, which will react with a crosslinking agent to form a film coating.

Detailed description of the methods of preparing the dispersants according to the present invention are provided in Examples 1 to 3. The dispersants prepared according to the present invention were used to prepare pigment dispersion compositions, a polyurethane black coating and an amino resin film in Examples 4 to 6.

EXAMPLE 1

Synthesis of Dispersant from Homopolycaprolactone 40 parts by weight of lauric acid, 456 parts by weight of ε-caprolactone and 0.5 parts by weight of tetrabutyl titanate (TYZOR® TBT from E.I. Dupont de Nemours, Inc.) were charged to a reactor. The reactor was equipped with a mechanical stirrer, a nitrogen inlet tube, a water separator, a thermometer, an addition funnel and a water cooled reflux condenser and an electric heating mantle. The reaction temperature was slowly raised to 180° C. under $N_2$ and held for 10 hours. The polymer produced was a yellow solid at room temperature, with an acid value of 22.2 and 98% by weight non volatiles, tested for 1 hour at 110° C. After the temperature cooled down to 110° C., 21.5 parts by weight of pentaethylenehexamine (Aldrich Chemicals) were added into the reaction mixture, which was then heated to 125° C. with stirring for 6 hours. Subsequently, the reaction mixture was cooled to 70° C. 300 parts by weight of xylene was added to the reaction mixture to reduce its viscosity. 31 parts by weight of succinic anhydride was then added. The temperature was allowed to increase to 75° C. without heating and allowed to continue at 75° C. for 30 min. FT-IR spectrum of the reaction mixture showed the disapppearance of the anhydride peak at 1750–1800 cm-1. More xylene was added to make a 50 weight % solution (Dispersant 1).

EXAMPLE 2

Synthesis of Dispersant from Homopoly 12-Hydroxystearic Acid 460 parts by weight of 12-hydroxystearic acid (acid #180 and hydroxy #157), 60 parts by weight of xylene and 0.4 parts by weight of dibutyl tin oxide (Aldrich Chemicals) were charged to a reactor similarly equipped as in Example 1. The reaction temperature was slowly raised to 205° C. under $N_2$ for 7 hours until all of the water generated was removed by azeotropic distillation. The xylene was then removed from the reaction mixture via distillation. The polyester formed was a brown liquid with an acid number of 37. After the reactor was cooled to 110° C., 31 parts by weight of pentaethylenehexamine (Aldrich Chemicals) were added. The reaction was then continued for 6 hours at 125° C. then cooled to 70° C. 300 parts by weight of xylene were then added to reduce the viscosity of the mixture followed by the addition of 31 parts by weight of succinic anhydride. The reactor temperature was then allowed to increase slightly without heating and the reaction was continued at 75° C. for 30 min. FT-IR spectrum of the reaction mixture showed complete disapppearance of the anhydride peak at 1750–1800 cm-1. More xylene was added to make a 50 wt % solution (Dispersant 2).

EXAMPLE 3

Synthesis of Dispersant from a Copolymer of Caprolactone and 12-Hydroxystearic Acid 375 parts by weight of 12-hydroxystearic acid (acid #180, hydroxyl #157), 375 parts by weight of ε-caprolactone (Aldrich Chemicals), 1.0 part by weight of dibutyltin oxide (from Aldrich) and 100 parts by weight of xylene were charged to a reactor equipped as in Example 1. The reaction temperature was slowly raised and held at 200° C. for 10.5 hours under $N_2$. The water generated was removed by azeotropic distillation. Then, xylene was removed via distillation. The resulting polymer was a yellow waxy material with an acid number of 17.0. After the reaction mixture was cooled to 110° C., 26 parts by weight of tetraethylenepentamine were added with stirring and the temperature was increased and held at 125° C. for 6 hours. After cooling to 70° C., 500 parts by weight of xylene were added to reduce the viscosity followed by 28 parts by weight of maleic anhydride. The temperature was allowed to increase slightly from the exothermic reaction and the reaction was allowed to continue at 75° C. for 30 min. The FT-IR spectrum of the reaction mixture showed the disapppearance of the anhydride peak at 1750–1800 $cm^{-1}$. More xylene was added to make a 50 wt % solution (Dispersant 3).

EXAMPLE 4

Dispersant Evaluation

The dispersants of Examples 1, 2 and 3 were evaluated based on the appearance of pigment grindings prepared therewith. A dispersant with good wetting and de-flocculation capability usually leads to a less viscous liquid dispersion. When there is pigment flocculation after grinding, the resulting dispersion has a high viscosity or may even be a gel. The dispersants of Examples 1, 2 and 3 were compared to a commercial amine functional dispersant, SOLSPERSE® 32500 (Avecia Ltd., formerly Zeneca Limited, UK). It is believed that SOLSPERSE® 32500 is a condensation product of polyethyleneimine and polycarbonylalkylenoxy compound described in U.S. Pat. No. 5,700,395.

The pigment, MONARCH 1300®, a high color carbon black, was added to a clear solution containing the dispersant. JONCRYL 500® (an acrylic resin from S.C. Johson Polymer) and butyl acetate (a solvent) were then added to form a mixture, the grinding composition. The amounts shown in Table 1 are in parts by weight. The grinding mixture was added to a 125 mL plastic bottle filled with 300 grams of ¼ inch stainless steel beads. Grinding was accomplished by shaking the plastic bottle for 90 min with a paint shaker before checking the appearance. Table 1 shows the appearance of the resulting grinding compositions. With the dispersants according to the present invention, non-viscous liquids that are thin to thick liquids were obtained. Whereas, with SOLSPERSE® 32500, thick pastes were obtained. This shows that the dispersants according to the present invention are much more effective for dispersing the pigment and maintaining a stable dispersion of the pigment in the solvent.

TABLE 1

HIGH COLOR CARBON BLACK GRINDING COMPOSITION

| Material | Dispersant 1 | Dispersant 2 | Dispersant 3 | SOLSPERSE 32500[1] |
|---|---|---|---|---|
| JONCRYL 500[2] | 7.5 | 7.5 | 7.5 | 7.5 |
| Butyl acetate | 23 | 23 | 23 | 20 |
| Dispersant | 12 | 12 | 12 | 15 |
| MONARCH 1300[3] | 7.5 | 7.5 | 7.5 | 7.5 |
| Total | 50 | 50 | 50 | 50 |
| Appearance after grinding | Thin liquid | liquid | Thin liquid | Thick paste |
| Appearance overnight | Thin liquid | Thick liquid | Thin liquid | Thick paste |

[1] A 40 wt % of an amine functional dispersant in butyl acetate from Avecia Ltd., Manchester, England.
[2] An acrylic resin, 80 wt % in Methyl amyl ketone, 140 hydroxy number on solids, S.C. Johnson Polymer, Sturtevant, WI.
[3] High color carbon black, surface area, 560 m$^2$/g, Cabot Corp., Billerica, MA.

EXAMPLE 5

Dispersants in Black Polyurethane Coating Compositions

Each of the pigment grinding compositions in Example 4 was separately blended in a paint mixer to part A of a two component high gloss polyurethane black formulation. Each of the blends was then mixed in a paint mixer with a polyisocyanate crosslinker, part B, the second component of the high gloss polyurethane black formulation. Each of the mixtures, was applied on a phosphate treated steel panel designated B° 1000 with a bird applicator, a film making tool, to form a film coating on the steel panel. The coated films were evaluated after cure for 30 minutes at 80° C. and for 1 week at room temperature. The average thickness of the dry films is about 1.2 mils. The amounts in the table are in parts by weight. The results of the evaluation are presented in Table 2 and show that the films obtained from the dispersants of the present invention are glossy and hard. Whereas, the film obtained using SOLSPERSE® 32500 was unacceptable with particles and bubbles on the surface. As a result, gloss and hardness of the resulting coating with SOLSPERSE® 32500 could not be evaluated.

TABLE 2

DISPERSANTS IN TWO COMPONENT POLYURETHANE BLACK COATING FORMULATIONS

| | Dispersant 1 | Dispersant 3 | SOLSPERSE ® 32500 |
|---|---|---|---|
| Part A: | | | |
| Grindings from Example 4 | 24 | 24 | 24 |
| JONCRYL 500 ® | 45 | 45 | 45 |
| Methyl isobutyl ketone | 11 | 11 | 11 |
| Dibutyl tin dilaurate | 0.011 | 0.011 | 0.011 |
| Part B: | | | |
| DESMODUR N-3300 ®[4] | 20 | 20 | 20 |
| Total | 100 | 100 | 100 |
| FILM PROPERTIES | | | |
| GLOSS, %, 20°/60° | 90/96 | 89/95 | Particles/bubbles on film surface, gloss & hardness cannot be measured |
| Pendulum hardness, Seconds | 145 | 142 | |

[4] Polyisocyanate crosslinker from Bayer Inc., Pittsburgh, PA.

EXAMPLE 6

Dispersants in an Amino Resin Black Paint Formulation

Each of the carbon black grinding compositions in Example 4 was separately blended in a paint mixer with an acrylic resin, a melamine crosslinker, a catalyst and a solvent to form a one component amino resin bake formulation. The amounts shown in Table 3 are in parts by weight. Each of the formulations was applied on a phosphate treated B° 1000 steel panel with a bird applicator. The panels were then baked at 140° C. for 20 min. The average thickness of the dry film formed is about 1.2 mils. Hard and glossy films were obtained with the dispersants in this invention.

TABLE 3

DISPERSANTS IN BLACK BAKE FORMULATIONS

| | Dispersant 1 | Dispersant 3 |
|---|---|---|
| Grinding composition from Example 4 | 30 | 30 |
| JONCRYL 500 ® | 46 | 46 |
| RESIMENE 747 ®[5] | 18 | 18 |
| NACURE 5543 ®[6] | 1.2 | 1.2 |
| n-Butanol | 4.8 | 4.8 |
| Film properties[a] | | |
| Gloss 20°/60°, % | 86/97 | 85/96 |
| Pendulum hardness, seconds | 136 | 132 |

[a] cure schedule: 20 min at 140° C.
[5] Hexamethoxymethylmelamine from Solutia Inc., Springfield, MA
[6] Blocked dodecyl benzene sulfonic acid catalyst, 25% active, King Industries, Norwalk, CT.

The above examples are provided to illustrate the invention and are not to be construed to limit the scope of the invention as claimed.

I claim:

1. A carboxylic acid functional pigment dispersant having the structure:

   (I)

wherein:
PE is a linear or branched polyester homo- or co-polymer with a molecular weight between 500–20,000, preferably 800–5,000, and wherein the degree of polymerization m is in the range of 1–100;

PA is selected from the group consisting of:
a. a polyalkylpolyamine wherein the alkyl is $C_2$–$C_{10}$ alkyl selected from the group consisting of diethylene triamine, triethylenetetramine, tetraethylenepentamine, dipropylenetriamine, tripropylenetetramine, tetrapropylenepentamine, pentaethylenehaxamine, bis(hexamethylene)triamine, pentapropylenehexamine, N,N'-bis(3-aminopropyl)-ethylenedimine, tris(aminoethyl)amine, hexaethyleneheptamine, hexapropyleneheptamine, spermidine and spermine;
b. a linear or branched polyalkylene imine selected from the group consisting of polyethyleneimine with a molecular weight up to 50,000, linear and branched polypropyleneimine with a molecular weight of up to 50,000,
c. polyallylamine;

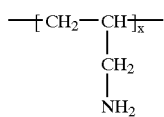

wherein x=10–1,000;
d. a cycloaliphatic amine with more than two amine functional groups per molecule, selected from the group consisting of a hydrogenated polyformaldehyde—aniline adduct, piperazinylethyldiethylenetriamine, piperazinylethylethylenediamine, piperazinylethyltriethylenetetraamine, piperazinylethyltetraethylenepentamine and hydrogenated diaminopyrimidine;
e. a mixture of polyalkylpolyamines defined above; and A is a moiety formed from the reaction of a 5 or 6 member ring anhydride with the free primary or secondary amines resulting from the condensation reaction of the polyester and the polyamine, an amic acid with the structure:

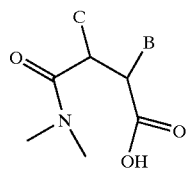

wherein B, C=H, $C_1$–$C_{20}$ alkyl or alkenyl or B and C together form a double bond, a cyclic aliphatic or aromatic group selected from the group consisting of benzyl, carboxyl substituted benzyl, cyclohexyl and cyclohexenyl, alkyl substituted cyclohexyl and cyclohexenyl, wherein alkyl is linear or branched $C_1$–$C_{20}$, and n=2–100 and the anhydride is elected from the group consisting of maleic anhydride, succinic anhydride, phthalic anhydride, tetrahydrophthalic anhydride, methyltetrahydrophthalic anhydride, hexahydrophthalic anhydride, methyl hexahydropthalic anhydride, trimellitic anhydride, alkenyl and alkyl succinic anhydride wherein the alkenyl or alkyl moiety is $C_1$–$C_{20}$ alkenyl or alkyl.

2. A pigment dispersant according to claim 1 wherein the polyester is prepared from a monomer selected from the group consisting of hydroxyalkylcarboxylic acid, a hydroxyalkylcarboxylic ester, a lactone or a mixture thereof, wherein the alkyl between the hydroxy group and the carboxyl group is a branched or linear alkyl with 1 to 20 carbons.

3. A pigment dispersant according to claim 2 wherein the monomer is a hydroxyalkylcarboxylic acid selected from the group consisting of lactic acid, glycolic acid, hydroxybutyric acid, 6-hydroxyhexanoic acid, dimethylolpropionic acid, ricinoleic acid, 12-hydroxystearic acid, 12-hydroxydodecanoic acid, 5-hydroxydodecanoic acid, 5-hydroxydecanoic acid and 4-hydroxydecanoic acid, and esters and lactones thereof.

4. A pigment dispersant according to claim 3 wherein the lactone monomer is ε-caprolactone or methyl-ε-caprolactone.

5. A pigment dispersant according to claim 1 wherein the polyester, PE, is a homopolymer having a molecular weight of between 800–5,000.

6. A pigment dispersant according to claim 1 wherein m=2–50.

7. A pigment dispersant according to claim 5 wherein m=2–50.

8. A pigment dispersant according to claim 1 wherein n=2–50.

9. A pigment dispersant according to claim 5 wherein n=2–50.

10. A pigment dispersant according to any one of claims 5, 6, 7, 8 and 9 wherein the polyester is a homopolymer of 12-hydroxystearic acid.

11. A pigment dispersant according to claim 10 wherein the polyamine is pentaethylenehexamine and the anhydride is succinic anhydride.

12. A pigment dispersant according to claim 8 wherein the polyester is a homopolymer of ε-caprolactone terminating with lauric acid.

13. A pigment dispersant according to claim 1 wherein the polyester, PE, is a copolymer having a molecular weight of between 800–5,000.

14. A pigment dispersant according to claim 13 wherein m=2–50.

15. A pigment dispersant according to claim 13 wherein n=2–50.

16. A pigment dispersant according to any one of claims 13, 14, and 15, wherein the polyester is a copolymer of 12-hydroxystearic acid and ε-caprolactone.

17. A pigment dispersant according to claim 16 wherein the polyamine is tetraethylenepentamine and the anhydride is selected from the group consisting of maleic anhydride, methyltetrahydrophthalic anhydride, and succinic anhydride.

18. A method of preparing carboxylic acid functional pigment dispersant according to claim 1 comprising the following steps:
i. polymerizing a monomer selected from the group consisting of a hydroxycarboxylic acid, an ester thereof, a lactone thereof or a mixture thereof to form a polyester with a molecular weight between 500–20,000;
ii. condensing the polyester formed with a polyamine to form a polyamide;
iii. reacting the amide with an anhydride to convert any free primary and secondary amine groups.

19. A method according to claim 18 wherein the temperature of step 1 for preparing the polyester is between 100° C. and 250° C.; the temperature for step 2 for condensing the polyamine with the polyester is between 80° C. and 150° C. and the temperature for step 3 for forming the amic acid is between 0° C. and 120° C.

20. A method according to claim 19 wherein the temperature of step 1 for preparing the polyester is between 150° C. and 220° C.; the temperature of step 2 for condensing the polyamine and the polyester is 100° C. and 130° C. and the temperature for step 3 forming the amic acid is 20° C. and 80° C.

21. A method to prepare the carboxylic acid functional dispersant of claim 2 according to claim 19.

22. A method to prepare the carboxylic acid functional dispersant of claim 2 according to claim 20.

23. A method to prepare the carboxylic acid functional dispersant of claim 3 according to claim 19.

24. A method to prepare the carboxylic acid functional dispersant of claim 3 according to claim 20.

25. A method to prepare the carboxylic acid functional dispersant of claim 4 according to claim 19.

26. A method to prepare the carboxylic acid functional dispersant of claim 4 according to claim 20.

27. A method to prepare the carboxylic acid functional dispersant of claim 5 according to claim 19.

28. A method to prepare the carboxylic acid functional dispersant of claim 5 according to claim 20.

29. A method to prepare the carboxylic acid functional dispersant of claim 6 according to claim 19.

30. A method to prepare the carboxylic acid functional dispersant of claim 6 according to claim 20.

31. A method to prepare the carboxylic acid functional dispersant of claim 7 according to claim 19.

32. A method to prepare the carboxylic acid functional dispersant of claim 7 according to claim 20.

33. A method to prepare the carboxylic acid functional dispersant of claim 8 according to claim 19.

34. A method to prepare the carboxylic acid functional dispersant of claim 8 according to claim 20.

35. A method to prepare the carboxylic acid functional dispersant of claim 9 according to claim 19.

36. A method to prepare the carboxylic acid functional dispersant of claim 9 according to claim 20.

37. A method to prepare the carboxylic acid functional dispersant of claim 10 according to claim 19.

38. A method to prepare the carboxylic acid functional dispersant of claim 10 according to claim 20.

39. A method to prepare the carboxylic acid functional dispersant of claim 11 according to claim 19.

40. A method to prepare the carboxylic acid functional dispersant of claim 11 according to claim 20.

41. A method to prepare the carboxylic acid functional dispersant of claim 12 according to claim 19.

42. A method to prepare the carboxylic acid functional dispersant of claim 12 according to claim 20.

43. A method to prepare the carboxylic acid functional dispersant of claim 13 according to claim 19.

44. A method to prepare the carboxylic acid functional dispersant of claim 13 according to claim 20.

45. A method to prepare the carboxylic acid functional dispersant of claim 14 according to claim 19.

46. A method to prepare the carboxylic acid functional dispersant of claim 14 according to claim 20.

47. A method to prepare the carboxylic acid functional dispersant of claim 15 according to claim 19.

48. A method to prepare the carboxylic acid functional dispersant of claim 15 according to claim 20.

49. A method to prepare the carboxylic acid functional dispersant of claim 16 according to claim 19.

50. A method to prepare the carboxylic acid functional dispersant of claim 16 according to claim 20.

51. A method to prepare the carboxylic acid functional dispersant of claim 17 according to claim 19.

52. A method to prepare the carboxylic acid functional dispersant of claim 17 according to claim 20.

* * * * *